United States Patent [19]

Komiyama

[11] Patent Number: 5,121,275
[45] Date of Patent: Jun. 9, 1992

[54] OPTICAL SENSOR ARRANGEMENT FOR TAPE CASSETTE

[75] Inventor: Kohzo Komiyama, Hadano, Japan

[73] Assignee: Kabushiki Kaisha Toshiba, Kanagawa, Japan

[21] Appl. No.: 465,313

[22] Filed: Jan. 12, 1990

[30] Foreign Application Priority Data

Jan. 13, 1989 [JP] Japan .............................. 1-006483

[51] Int. Cl.$^5$ .................. G11B 23/02; G11B 15/48
[52] U.S. Cl. ............................... 360/132; 360/74.6
[58] Field of Search ............................. 360/74.6, 132

[56] References Cited

U.S. PATENT DOCUMENTS

| 4,763,217 | 8/1988 | Oishi | 360/132 |
| 4,862,305 | 8/1989 | Katagiri et al. | 360/132 |
| 4,901,171 | 2/1990 | Urayama et al. | 360/74.6 |

FOREIGN PATENT DOCUMENTS

1-49188  2/1989  Japan .................................. 360/74.6

*Primary Examiner*—John H. Wolff
*Assistant Examiner*—Jefferson Evans
*Attorney, Agent, or Firm*—Banner, Birch, McKie & Beckett

[57] ABSTRACT

A cassette tape having on both ends thereof a leader and player tape which transmits a greater amount of light than the tape body is wound and contained in a cassette body so that it can travel therein. The cassette body is provided with a detection beam path including a prism, a prism light window, and a transmitting light window. When the leader and player tape has reached the detection beam path, the detection beam is detected by a light receiving portion disposed on a cassette deck by a difference in the amount of transmitted light between the tape body and the leader and player tape, thereby allowing the start and/or end portions of the tape to be detected. The detection beam path includes light-shielding means for preventing extraneous light other than the detection beam from reaching it. This light-shielding means serves to eliminate the effect of the extraneous light on the detection beam receiving portion disposed on the cassette deck, thus contributing to improving the tape end detection accuracy.

1 Claim, 8 Drawing Sheets

OPTICAL SENSOR ARRANGEMENT FOR TAPE CASSETTE

FIELD OF THE INVENTION AND RELATED ART STATEMENT

This invention relates to a tape cassette, such as for a magnetic tape and more particularly to a tape cassette which is constructed so that the start and/or end portions of the tape carried by the cassette can be detected by a difference in the amount of light transmitted thereby.

With increasing recording densities of magnetic tapes, such as seen in cassette tapes for DAT (Digital Audio Taperecorder) and VCR in recent years, a necessity is growing for detecting the start and/or end portions of a magnetic tape before the magnetic tape is completely wound or rewound. This is because an abrupt stopping of the operation of a tape travel mechanism upon completion of winding the tape in order to halt tape travel may cause damage to the tape or may load the head due to a strong tension applied to the tape in that instance, thereby deteriorating the recording and reproducing characteristics of the device.

For this reason, DAT and VCR cassette tapes include a transparent leader and player tape provided at both start and end portions of the magnetic tape and adopt a mechanism in which the start and end portions are detected by differences in the amount of light transmitted between the leader and player tape and the magnetic tape.

Figure 1:
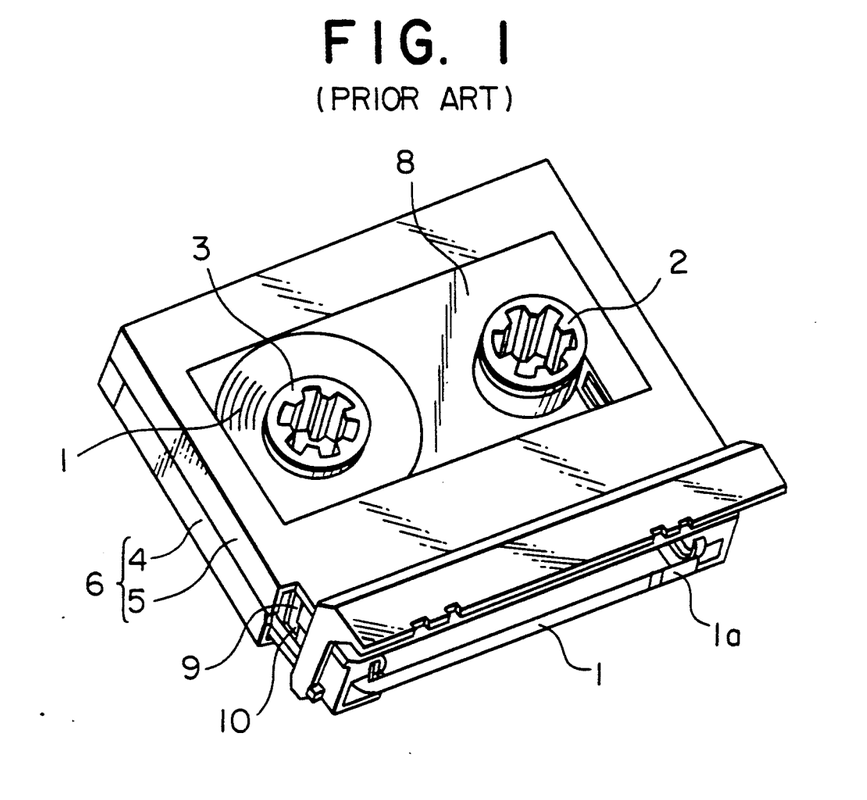
FIGS. 1 and 2 are perspective views showing an example of a conventional prior art DAT tape cassette.

FIG. 1 is a schematic representation of a typical DAT cassette tape equipped with such a light detection mechanism. A magnetic tape 1 includes the transparent leader and player portion 1a which is present on each of the start and end portions thereof. This magnetic tape 1 is wound around hubs 2, 3, rotatably mounted on a lower shell 4, and contained in a cassette body 6 consisting of the lower shell 4 and an upper shell 5.

Figure 2:
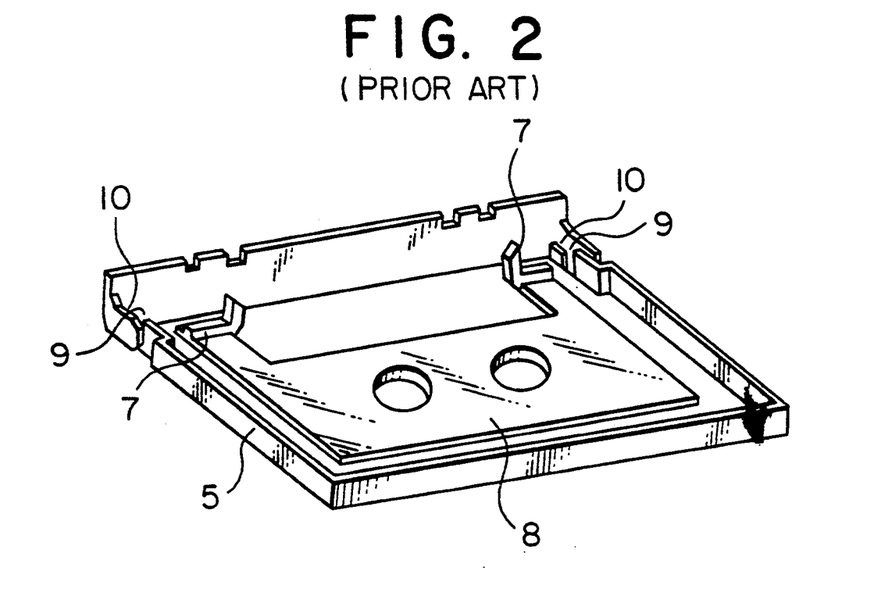

The upper shell 5 has, as shown in FIG. 2, prisms 7 which are adapted to form part of an optical path of a detection light beam for detecting the start and/or end portions of the magnetic tape 1. The upper shell 5 is also provided with a transparent window 8 of a proper size and transparency so that the remaining amount of the magnetic tape 1 inside the cassette body can be visually be checked. Alternatively, some cassette tapes may have both shells 4, 5 made entirely of a transparent resin. On the sidewalls of the upper shell 5 there are provided prism light windows 9 for introducing the detection beam projected from without the cassette body into the prisms 7 and for guiding it out to the outside, and transmitting light windows 10 for guiding the detection beam projected from within the cassette to the outside. The prism 7 is made of a material, such as a transparent resin, and is, for example, formed integrally with the transparent window 8.

Two methods of detecting the start and end portions of the DAT cassette tape are available. Both are based on the fact that the leader and player tape 1a transmits a greater amount of light than the magnetic tape 1.

The first detection method involves the above-mentioned prism 7. A detection beam projected from a detection beam projecting portion disposed on the cassette deck is introduced into the prism 7 by passing the projected detection beam through the prism light window 9 and injected to the magnetic tape 1 by causing the detection beam to, for example, reflect within the prism 7. It is not until the leader and player tape 1a has reached the detection portion that the detection beam is detected at an externally provided detection beam receiving portion and that the start and end portions of the magnetic tape 1 are detected.

On the other hand, the second detection method has the detection beam projecting portion installed in the cassette body, and a detection beam projected therefrom is transmitted to the magnetic tape 1 need of the prism 7. Similarly to the first detection method, upon arrival of the leader and player tape 1a at the detecting portion, the detection beam, which has passed through the transmitting light window 10, is detected at the detection beam receiving portion to thereby detect the start and end portions of the magnetic tape 1.

However, in the above conventional DAT tape cassette, the transparent window 8 arranged on the upper shell 5 for monitoring the tape conditions, and the like, inside the cassette body has, in some cases, been the source for causing erroneous operations in detecting the start and/or end portions of the magnetic tape 1. That is, extraneous light, such as illuminating light within the cassette deck and the room, or sunlight, are caused to pass through this transparent window 8 and may be reflected within, or transmitted through, the cassette body 6 to thereby reach the prism 7, the prism light window 9, and the transmitting light window 10, thus resulting in false operations of the detection beam receiving portion. Moreover, in the case where the prism 7 is constructed in one-piece with the transparent window 8, the extraneous light injected to the transparent window 8 is propagated therein, and this induces the extraneous light to reach the prism 7, and thus detection errors will be more likely to occur.

OBJECT AND SUMMARY OF THE INVENTION

Therefore, an object of this invention is to provide a tape cassette whose accuracy in detecting the start and-/or end portions of the tape contained therein is increased by eliminating the effect of extraneous light and thus preventing the erroneous detecting operations.

To achieve the above object, a tape cassette according to this invention comprises a cassette body having a tape travel path, a tape wound and contained within the cassette body so that the tape can travel along the tape travel path, a detection beam path arranged within the cassette body for guiding a detection beam for detecting the start and/or end portions of the tape into the tape travel path, and a means for shielding any extraneous light, other than the detection beam against reaching the interior of the detection beam path.

Examples of the means for shielding the extraneous light, other than the detection beam include:

(1) roughing the external surfaces of the cassette body, except both the light entrance and exit portions and the reflecting surfaces of the prism which will become part of the detection beam path;

(2) arranging a light-shielding material layer on the external surfaces of the cassette body excluding both the light entrance and exit portions and reflecting surfaces of the prism which will become part of the detection beam path;

(3) arranging light-shielding grooves for shielding the extraneous light propagated from a transparent window in the cassette body to the prism intermediate between the transparent window and the prism where the prism is part of the detection beam path and is formed integrally with the transparent window disposed above the tape-containing portion of the cassette body;

(4) arranging a light-shielding material so that the tape travel will not be disturbed by, for example, enclosing the outer surfaces of the detection beam path for guiding the detection beam formed with or without the prism; and (5) using a material which selectively absorbs the wavelength of a detection beam as a transparent window member.

These means may be used singly or in combinations of two or more.

Either the roughing of the outer surfaces of the prism which will serve as the detection beam path, or the provision of the light-shielding material layer on these surfaces serves not only to decay the extraneous light which may reach a prism surface, but also to prevent entry of the extraneous light into the prism. Further, the arrangement of the light-shielding grooves on an end portion of the transparent window, formed monolithically with the prism, also contributes to intercepting the extraneous light propagated through the transparent window and thus prevents the extraneous light from reaching the prism side. Furthermore, the enclosure of the outer surfaces of the detection beam path, which may or may not include the prism, with the light-shielding material enhances elimination of the effect of the extraneous light upon the detection beam path. Accordingly, erroneous operations in detecting the start and/or end portions of the tape can be prevented. To summarize the above, according to the invention, it is possible to prevent detection errors attributable to the introduction of extraneous light into a tape cassette by shielding the extraneous light against reaching the detection beam path.

DETAILED DESCRIPTION OF THE PREFERRED EMBODIMENTS

Embodiments of this invention will now be described with reference to the drawings.

Figure 3:
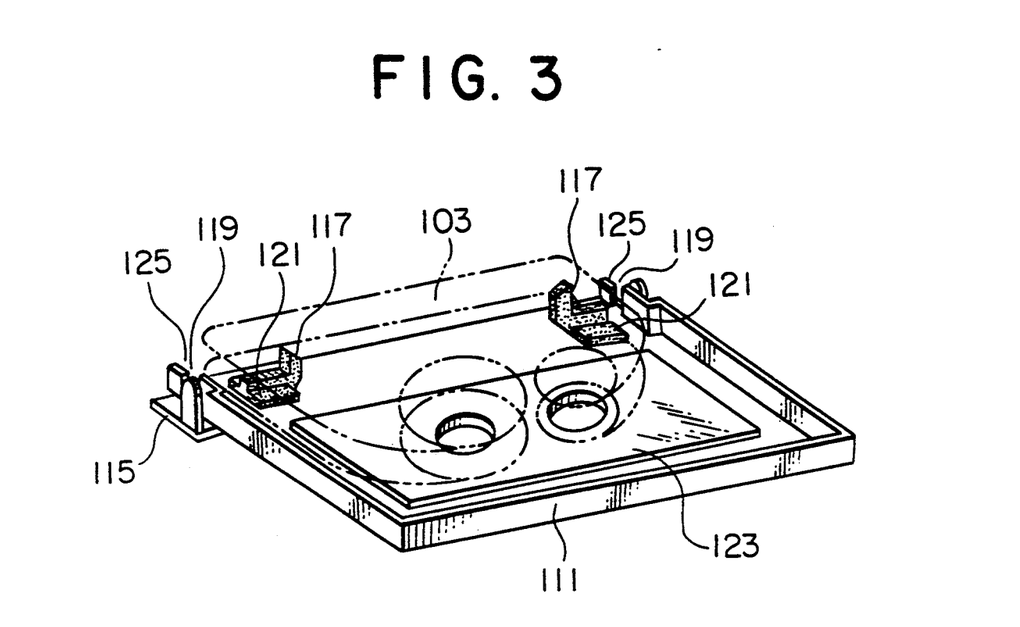
FIG. 3, is a perspective view showing a main portion of a DAT tape cassette which forms a first embodiment of the invention.
Figure 4:
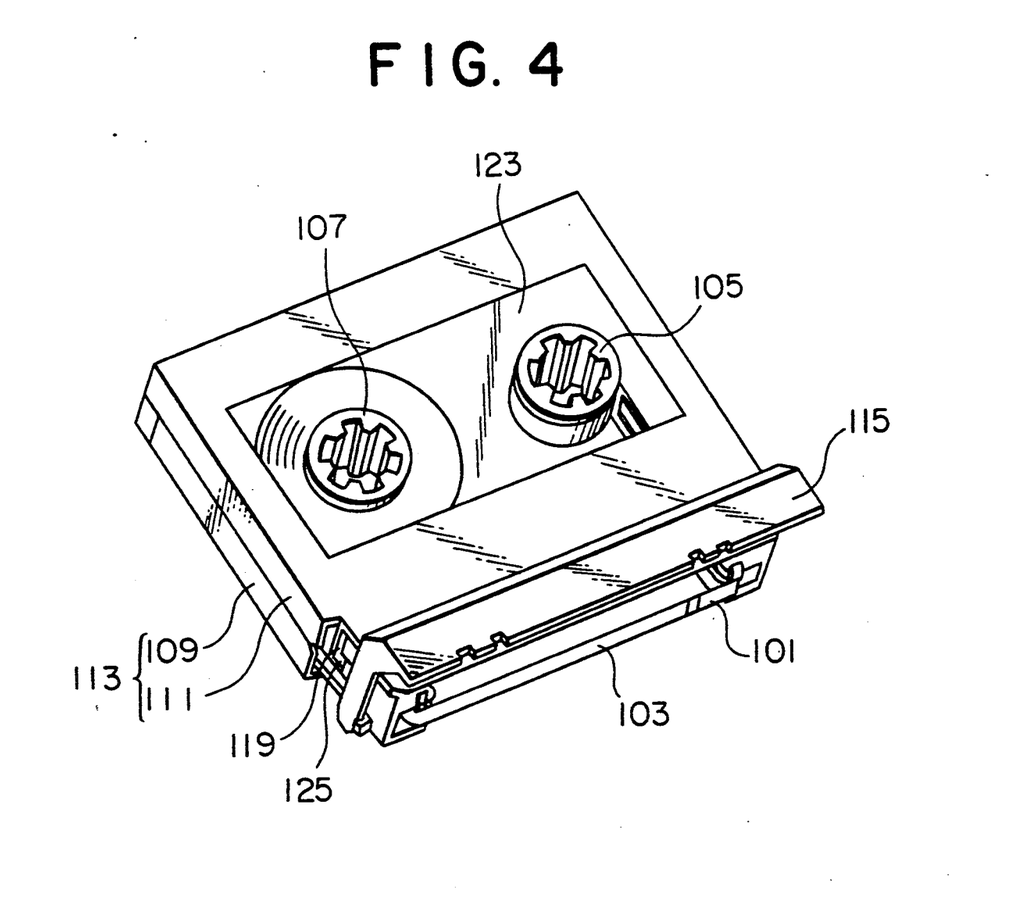
FIG. 4 is a perspective view showing the overall construction of the DAT tape cassette shown in FIG. 3.

FIGS. 3 and 4 are illustrations showing a first embodiment in which a tape cassette according to this invention is applied to a DAT tape cassette.

A magnetic tape 103 having on both ends thereof a leader and player tape 101 is wound on hubs 105, 107, rotatably mounted on a lower shell 109, and contained within a cassette body 113 consisting of the lower shell 109 and an upper shell 111. Further, the magnetic tape 103 can travel bidirectionally by the freely rotatable hubs 105, 107. The leader and player tape 101 is composed of a material which transmits a greater amount of light than a material of the magnetic tape 103, and serves as a detector for the start and end portions of the magnetic tape 103.

Toward the front of the upper shell 111 is a lid 115 which can freely open and close thereon. Prisms 117, which will become part of the optical path of a detection beam for detecting the start and/or end portions of the tape, are respectively provided on both ends close to openings for the lid 115 on the upper shell 111. These prisms 117 are arranged on the upper shell 111 by prism mounting plates 121 which are integrally formed with the prisms 117 so that the travel path of the magnetic tape 103 is formed substantially at right angles with the detection beam path and prism light windows 119 disposed on both side surfaces of the upper shell 111 through the tape travel path are in an opposed relation to the entrance/exit surfaces of the prisms 117, respectively.

The prism light windows 119 serve not only to introduce into the prisms 117 a detection beam incident from a detection beam projecting portion provided on the cassette deck but also to guide out into a detection beam receiving portion disposed also on the cassette deck the detection beam which has been reflected within the prisms 117. The prism light window 119 is a component of the detection beam path.

Further, a transparent window portion 123 made of a material, such as a resin of proper size and transparency, is provided in the middle of the upper shell 111 so that the amount of remaining magnetic tape 103 within the cassette body 113 can be visually observed.

Figure 5:
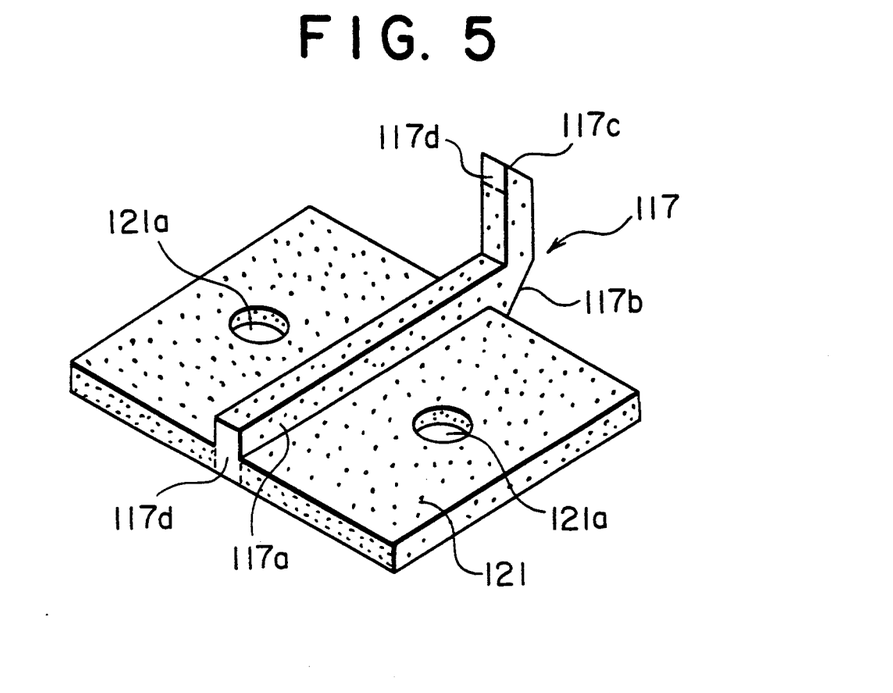
FIG. 5 is an enlarged perspective view showing a prism portion of the tape cassette shown in FIG. 3.

As shown in FIG. 5, the prism 117 comprises an L-shaped optical path 117a, a first reflecting surface 117b formed at the corner thereof, a second reflecting surface 117c formed at one end of the L-shaped optical path 117a, entrance/exit surfaces 117d arranged at the other end of the L-shaped optical path 117a and in the front of the second reflecting surface 117c, respectively. It is formed integrally with the prism mounting plate 121 by a material, such as a transparent resin, and disposed on the upper shell 111 by a mounting hole 121a arranged on the prism mounting plate 121.

The external surfaces of the integrally formed prism 117 and prism mounting plate 121 serve as a means for shielding extraneously incident light, and are roughened by, for example, blasting, except for the first and second reflecting surfaces 117b, 117c and the entrance/exit surfaces 117d, to have fine irregularities formed thereon.

There are a variety of methods of roughening, one of which may be such that when the prism 117 and the prism mounting plate 121 are molded into a monolithic piece, a required portion of the mold is roughened.

Reference numeral 125 denotes a transmitting light window serving as an optical path for ushering the detection beam projected from within the cassette body 113 to the outside.

The detection by the leader and player tape 101 of the start and/or end portions of the magnetic tape 103, which is a DAT cassette tape according to this first embodiment, will be performed in the following manner.

First, upon recognition of the magnetic tape 103 which has been inserted into the cassette deck as travelling, a detection beam is projected from the detection beam projecting portion disposed on the cassette deck and then injected to one of the entrance/exit surfaces 117d of the prism 117. The detection beam injected to the prism 117 is reflected on the first and second reflecting surfaces 117b, 117c arranged at the corner and at one tip of the L-shaped optical path 117a, and projected out into the travel path of the magnetic tape 103 from the other entrance/exit surface 117d. If the magnetic tape 103 is present in its travel path, the detection beam is shielded by the magnetic tape 103. If, then, the magnetic tape 103 further advances and the leader and player tape 101 reaches the front of the prism 117, the detection beam passes through the prism light window 119 and is detected by the detection beam receiving portion disposed on the cassette deck to thereby cause the end of the magnetic tape 103 to be detected.

In the DAT tape cassette according to the first embodiment, the surfaces of the prism 117 and the prism mounting plate 121 are processed into fine irregularities, except for the first and second reflecting surfaces 117b, 117c and the entrance/exit surfaces 117d. Thus, even if extraneous light incident from the transparent window 123 is, for example, reflected within the cassette body 113 to reach the surfaces of the prism 117 and the prism mounting plate 121, the extraneous light can adequately be decayed by diffused reflection on fine irregularities on the surfaces. Therefore, the effect of the extraneous light on the detection beam receiving portion disposed on the cassette deck can be driven away, thereby contributing to significantly improving the detection accuracy.

Figure 6:
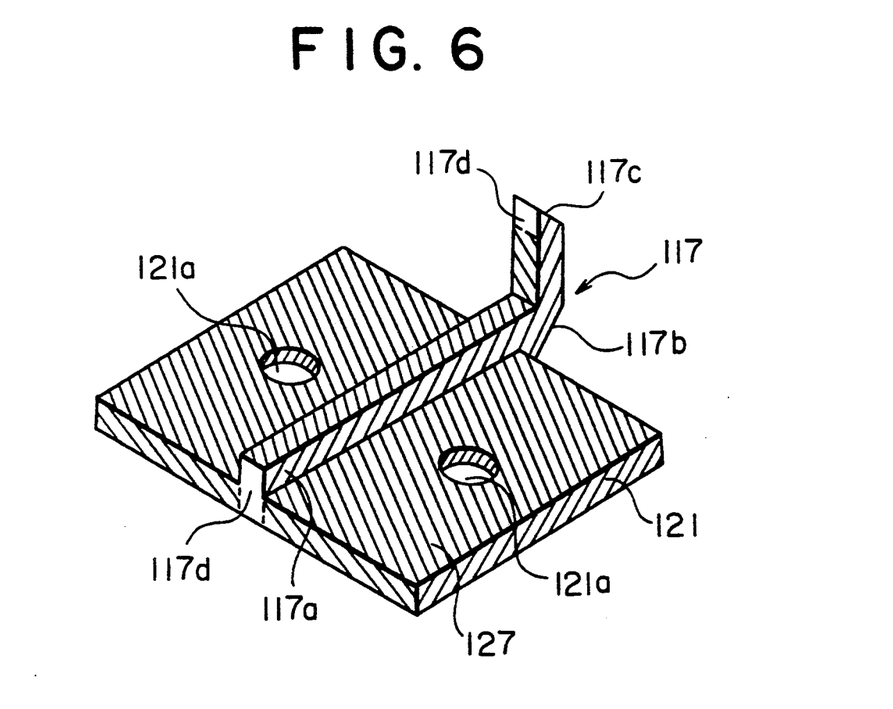
FIG. 6 is a perspective view showing a modified example of the prism portion of FIG. 5.

Means for shielding the extraneous light from the prism 117 and the prism mounting plate 121 for the DAT tape cassette according to this first embodiment may be, as shown in FIG. 6, a light-shielding material layer 127 (hatched in the figure), which is arranged on the same portions as the roughened and reflecting surfaces 117b, 117c and which provides the similar effect to the roughened surfaces. The light-shielding material layer 127 can be arranged by applying, e.g., a light-shielding coating material or depositing a light-shielding material based on a thin film forming method such as vapor deposition or sputtering.

Thus, the arrangement of the light-shielding material layer 127 on the external surfaces of the prism 117 and the prism mounting plate 121, which is integrally molded, may also contribute to preventing entry into these surfaces of the extraneous light which has reached there. Therefore, similarly to the above embodiment, the effect of the extraneous light can be eliminated and thus the detection accuracy can be appreciably improved.

A greater advantage may also be obtained from combining the roughening of the external surfaces of the monolithically formed prism 117 and prism mounting plate 121 with the arrangement of the light-shielding material layer 127.

A second embodiment of this invention will next be explained.

Figure 7:
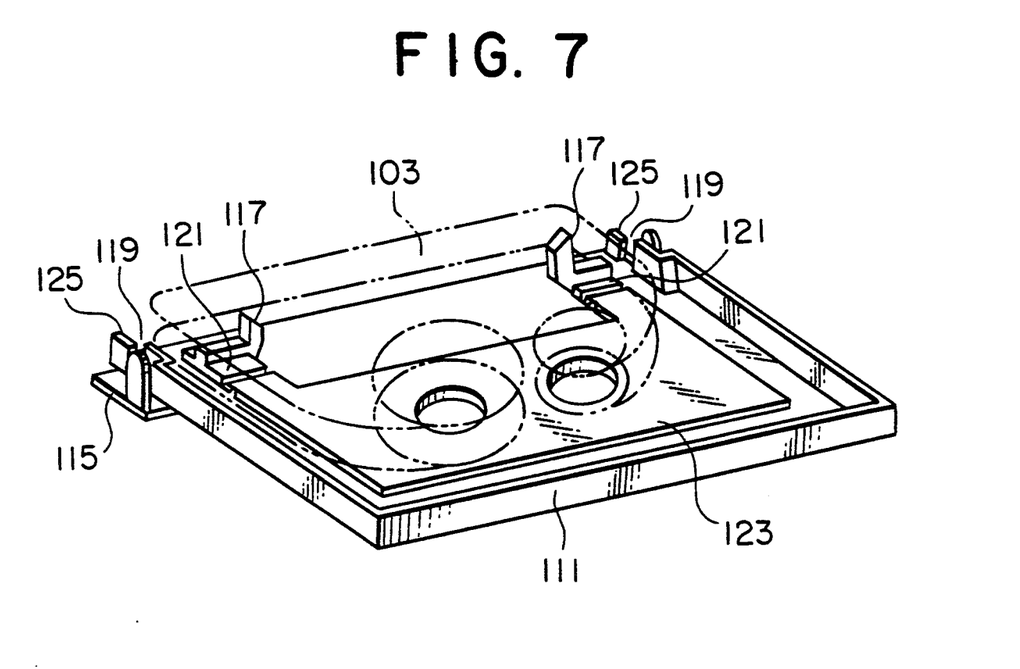
FIG. 7 is a perspective view showing a main portion of a DAT tape cassette incorporating a second embodiment of the invention.

FIG. 7 shows a main portion of a DAT tape cassette of the second embodiment. This DAT tape cassette has prism mounting plates 121 which are respectively integral with prisms 117 formed integrally also with a member of the transparent window 123. The other arrangement is the same as in the first embodiment.

Figure 8:
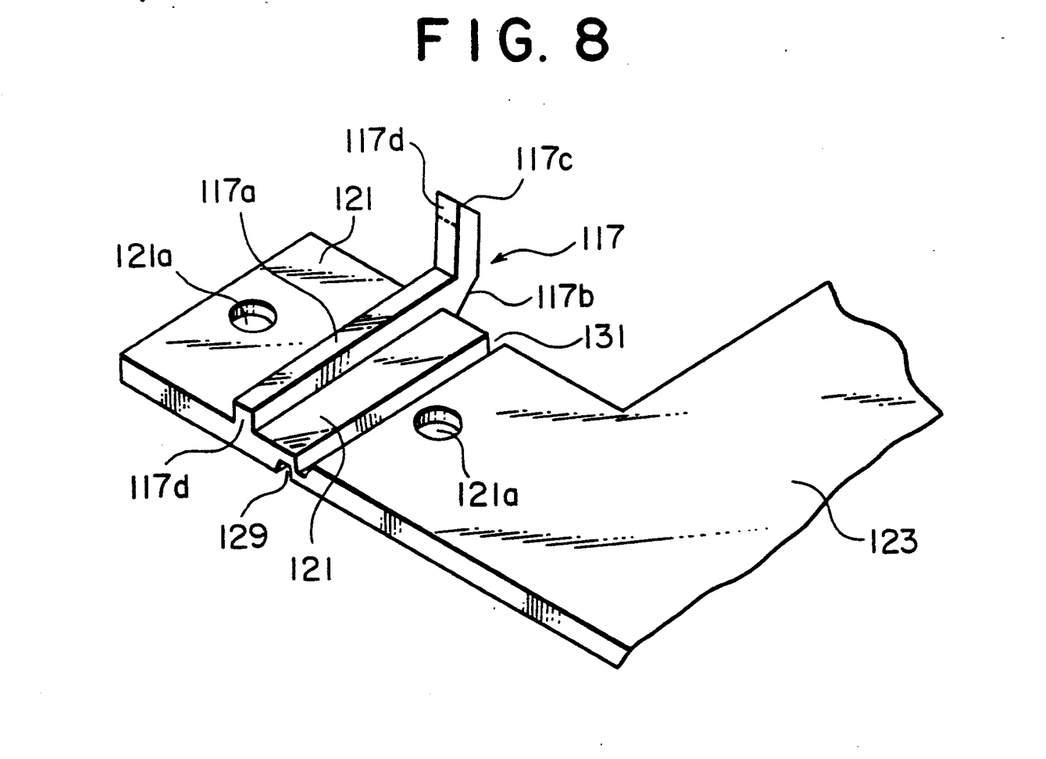
FIG. 8 is an enlarged perspective view of the prism portion shown in FIG. 7.
Figure 9:
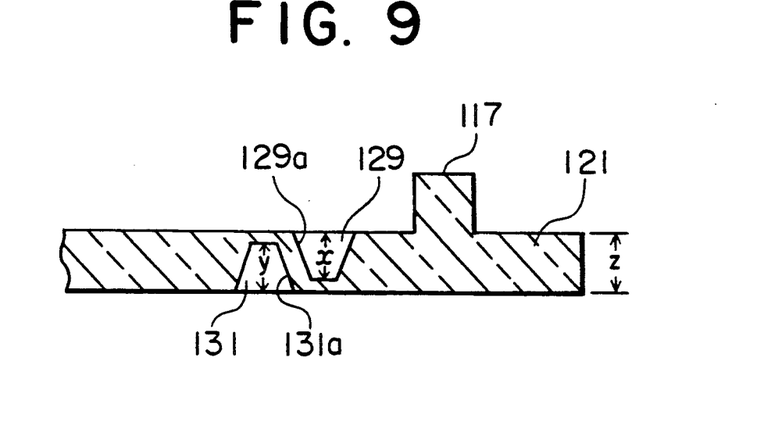
FIG. 9 is a sectional view showing light-shielding grooves in FIG. 8.

As shown in FIG. 8, in the DAT tape cassette of the second embodiment, a first light-shielding groove 129 and a second light-shielding groove 131 are respectively arranged in parallel with the L-shaped optical path 117a of the prism 117 midway between the prism 117 and the transparent window 123 on both front and rear surfaces of the prism mounting plate 121 as a means for shielding the extraneous light. These light-shielding grooves 129, 131 are formed so that the following relationship is satisfied, let x and y be the depth of the grooves, and z be the thickness of the prism mounting plate 121:

$$z \leq x + y$$

As shown in this second embodiment, the integration of the prism mounting plate 121 with the transparent window 123 is advantageous in terms of reducing the manufacturing cost. However, the transparent window 123 allows the extraneous light to be propagated therein and it is easy for the extraneous light to reach the prism 117. Therefore, such an arrangement is disadvantageous in terms of detecting the tape ends. In this second embodiment, the prism 117, having such a problem, includes the light-shielding grooves 129, 131 which satisfy the above-mentioned relationship, so that even if the extraneous light injected to the transparent window 123 has been propagated through the interior thereof, the extraneous light can be shielded by being either reflected or refracted on the surfaces 129a, 131a (inclined surfaces) of the light-shielding shielding grooves 129, 131, thereby intercepting the extraneous light and preventing it from reaching the prism 117. Therefore, the effect of the extraneous light upon the detection beam receiving portion disposed on the cassette deck can be eliminated and an inexpensive provision of a DAT tape cassette with improved accuracy of detecting the start and/or end portions of the magnetic tape 103 can be provided. Further, the means of shielding the extraneous light requires that only the light-shielding grooves be additionally arranged, thus being economical.

Figure 10:
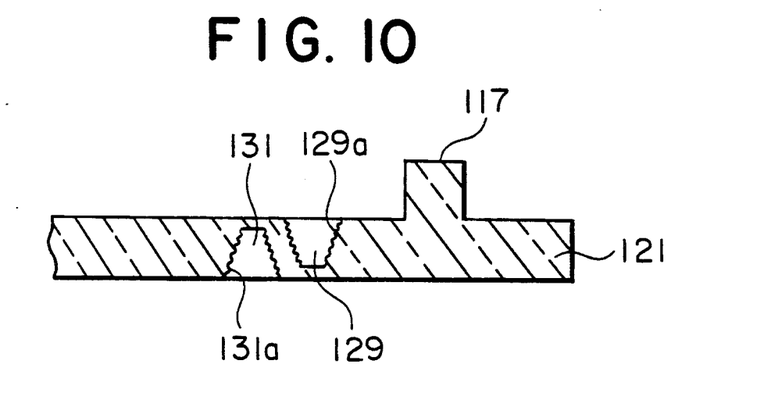
FIGS. 10 to 14 are sectional views showing modified examples of the light-shielding grooves shown in FIG. 9.
Figure 11:
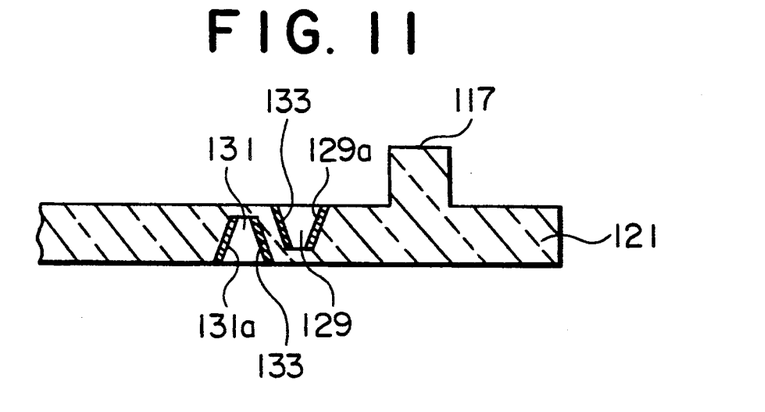
Figure 12:
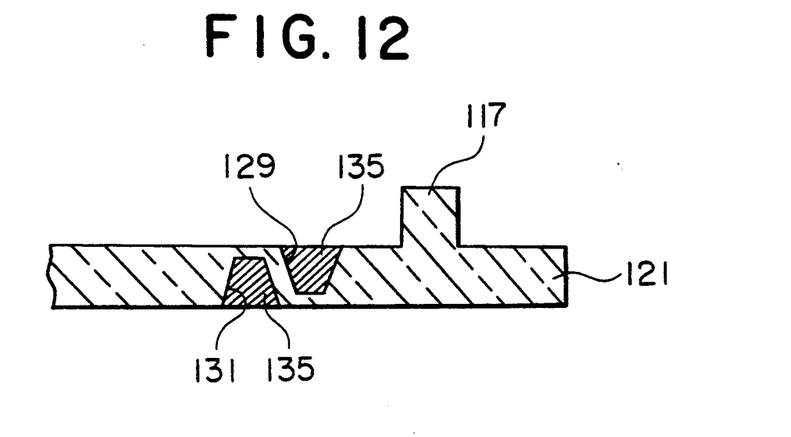

Also, to shield the extraneous light, propagated through the transparent window 123 and thus reaching the prism 117, by the light-shielding grooves 129, 131, their shielding effect will be further enhanced if the following means are added:

(a) roughening the side surfaces 129a, 131a of the light-shielding groves 129, 131, as shown in FIG. 10, to provide the effect of diffused reflection;

(b) arranging a light-shielding material layer 133 on the side surfaces 129a, 131a of the light-shielding grooves 129, 131, as shown in FIG. 11; and (c) using a light-shielding material 135 to fill the light-shielding grooves 129, 131 as shown in FIG. 12.

Figure 13:
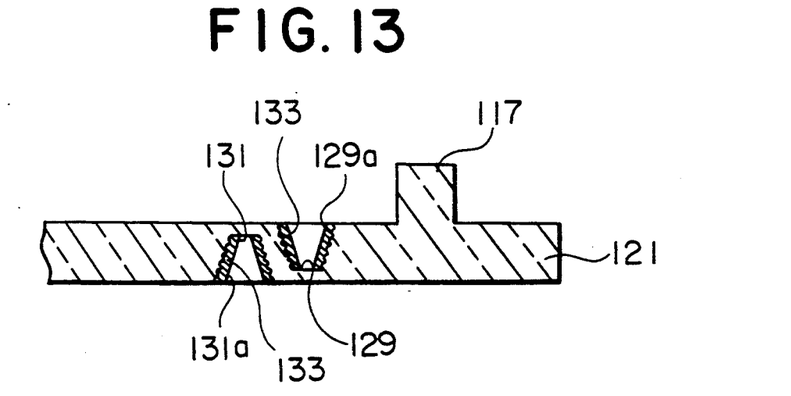
Figure 14:
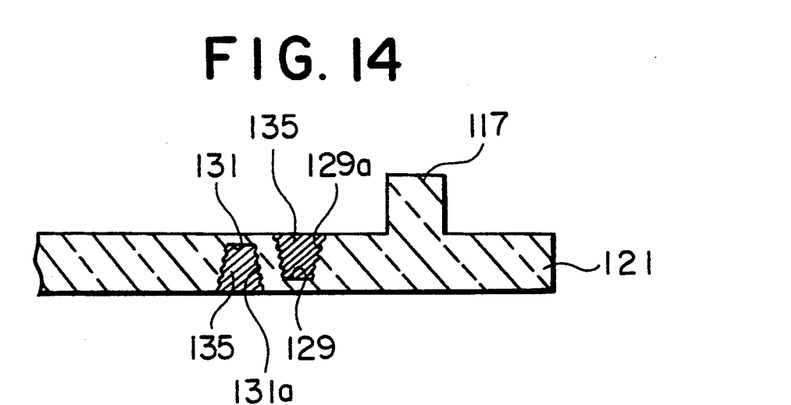

Further, both effects of the roughened surface-based diffused reflection and the light-shielding involving a light-shielding material can simultaneously be obtained by, for example, as shown in FIG. 13, forming the light-shielding material layer 133 on the roughened surfaces 129a, 131a, or by, as shown in FIG. 14, using the light-shielding material 135 to fill the light-shielding grooves 129, 131 with their side surfaces 129a, 131a roughened. These means contribute to further improving the effect of shielding the extraneous light, thereby increasing the detection accuracy.

Figure 15:
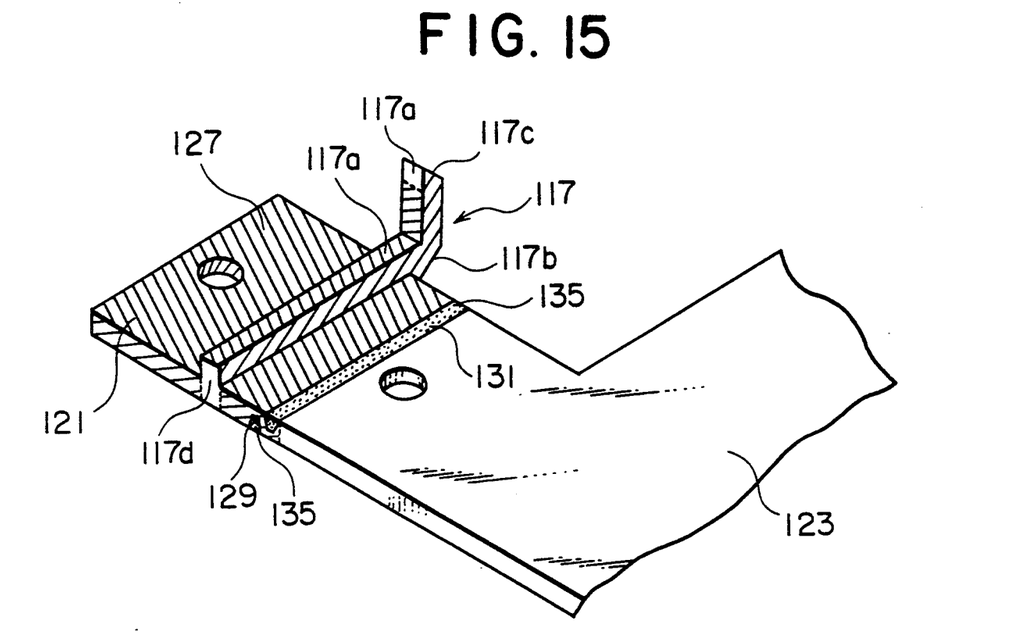
FIG. 15 is a perspective view showing a modified example of the embodiment of the invention shown in FIG. 8.

Also, as shown in FIG. 15, by providing the light-shielding grooves 129, 131 with the light-shielding material 135 filled therein and by further forming the light-shielding material layer 127 (hatched in the figure) on the surfaces of the prism 117 and prism mounting plate 121 from the light-shielding groves 129, 131, the detection accuracy may still further be improved.

More specifically, the light-shielding grooves 129, 131 with the light-shielding material 135 filled therein intercept the unnecessary extraneous light propagated through the transparent window 123. The light-shielding material layer 127 prevents the extraneous light, for example, reflected within the cassette body 113 to thereby reach the surfaces of the prism 117 and prism mounting plate 121 from entering into the prism 117. Further, instead of forming the light-shielding material layer 127 on the surfaces of the prism 117 and prism mounting plate 121, roughening these surfaces may provide the same effect.

A third embodiment of this invention will next be described.

Figure 16:
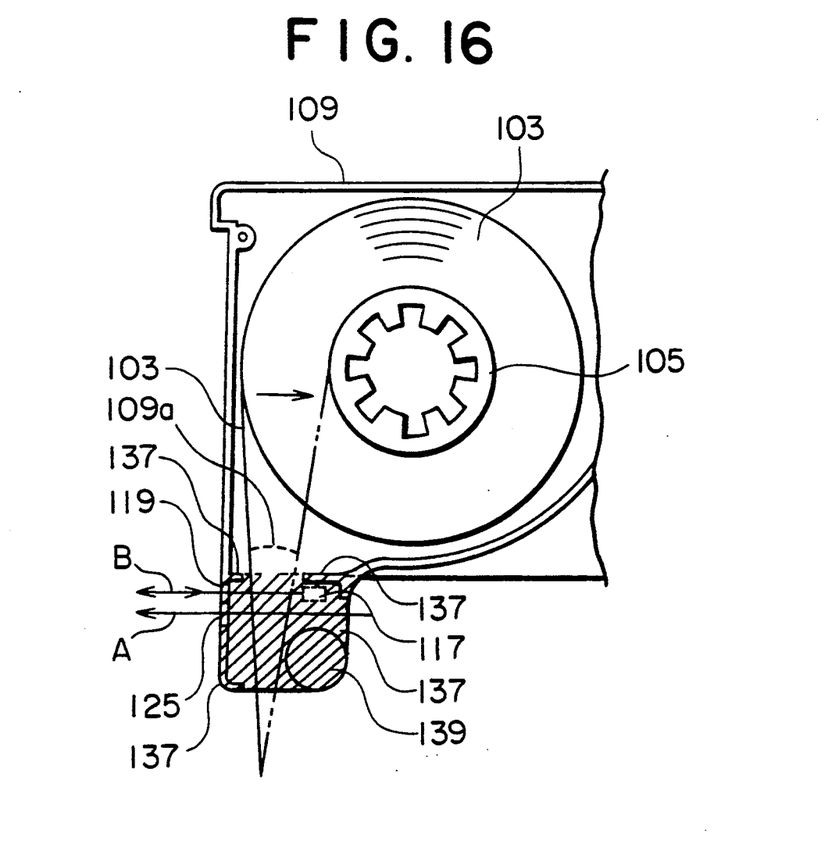
FIG. 16 is a somewhat schematic representation of a main portion of a DAT tape cassette which is another embodiment of the invention.

FIG. 16 shows a main portion of a lower shell 109 of a DAT tape cassette of the third embodiment.

The transparent light window 125 is provided on the side surface of the lower shell 109 so that a detection beam projected from a detection beam projecting portion inserted into the cassette body to the tape travel path can reach the detection beam receiving portion disposed outside the cassette body. Prism light windows 119 are also provided on prisms 117 which are arranged on the upper shell (not shown in the figure) so that the detection beam incident from the detection beam projecting portion disposed outside the cassette body and reflected on the prism 117 can reach the detection beam receiving portion disposed outside the cassette body.

The optical path (shown by arrow A in the figure) of the detection beam passing through the transparent beam window 125 and the optical path (shown by arrow B in the figure) of the detection beam passing through the prism light window 119 are enclosed by the surface of a light-shielding wall 137 arranged on the lower shell 109, the wall of the lower shell 109, and the surface of a guide roller 139 excluding a path 109a of the magnetic tape 103 so that the travel of the magnetic tape 103 will not be disturbed. These wall surfaces are coated with a light-shielding material (hatched in the figure).

The light-shielding material is also arranged on the same portions of the upper shell (not shown). The detection beam path is enclosed by the light-shielding material to the extent that the travel of the magnetic tape 103 will not be hindered. The arrangement other than this is the same as that of the DAT cassette tape shown in FIGS. 3 and 4.

In this third embodiment, the entry of unnecessary extraneous light into the detection beam path disposed inside the cassette body is prevented by the light-shielding material being arranged so that it encloses the detection beam path. Accordingly, also in a system in which no prism is used as the detection beam path, detection errors can be prevented. Further, this third embodiment is also advantageous when the prism is employed, and it may also be used in combination with the light-shielding means described in the previous embodiments.

Although in the above embodiments, the light-shielding means is provided on the prism itself or on the prism mounting plate, the light-shielding means in the following application is likewise effective.

Figure 17:
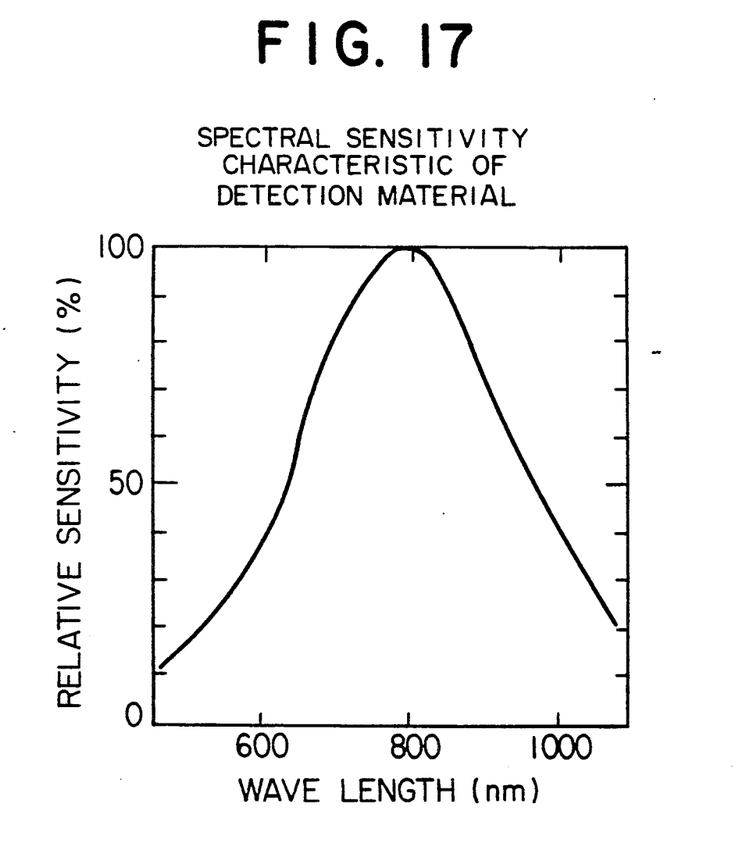
FIG. 17 in a diagram illustrating a relation between spectral sensitivity characteristic of detection material and relative sensitivity thereof.

For example, a material which can selectively absorb the wavelength of a detection beam and has transparency that allows observations inside the window is used as the component material of the transparent window 123. Specifically, a material, which can be a color filter damping the wavelength in which the spectral sensitivity of the detection material for the detection beam is high, can be used. Namely, as shown in FIG. 17, the color filter damp the wavelength 600 to 1000 nm or the wavelength more than 600 nm.

By using such a material as the component material of the transparent window 123, entry of light corresponding to the wavelength of a detection beam into the cassette body can be checked, thereby providing prevention against errors in detecting the start and/or end portions of the tape.

Although the above respective embodiments are the applications of the invention to DAT tape cassettes, the application of this invention is not limited thereto but can be extended to various types of magnetic tape cassettes including VCR tape cassettes, printer ribbons contained in a cassette, and the like.

What is claimed is:

1. A tape cassette comprising:
a cassette body having a tape travel path and a transparent window arranged to expose a location in which a tape is contained, the component material of said transparent window selectively absorbing the wavelength of a detection beam from a detection beam source;
a tape contained in said cassette body and wound therein so that it can travel along said tape travel path, said tape including leader tape sections at end portions of the tape, said leader tape sections having a greater light-transmittance than the other section of the tape;
means forming a detection beam path which is arranged within said cassette body and guides a detection beam from said detection beam source for detecting said leader tape sections at said end portions of said tape, said detection beam path comprising at least one prism which is disposed inside said cassette body for directing said detection beam and having surfaces thereon enclosing said detection beam and forming a part of said detection beam path, and a prism light window provided on a side surface of said cassette body for introducing said detection beam within said cassette body; and
means on said prism surfaces for shielding extraneous light which is admitted to said detection beam path from other than said detection beam source.

* * * * *